April 3, 1928.
M. J. MILZ
1,664,524
BAND WHEEL COUNTERBALANCE
Filed July 12, 1926
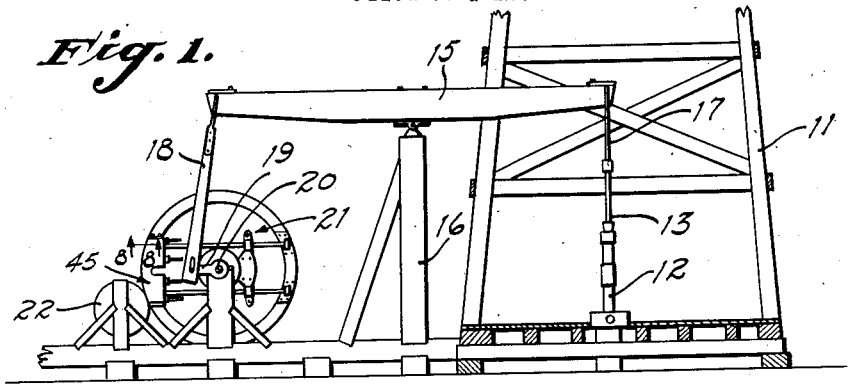
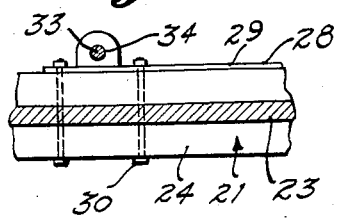
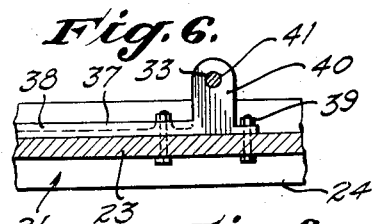
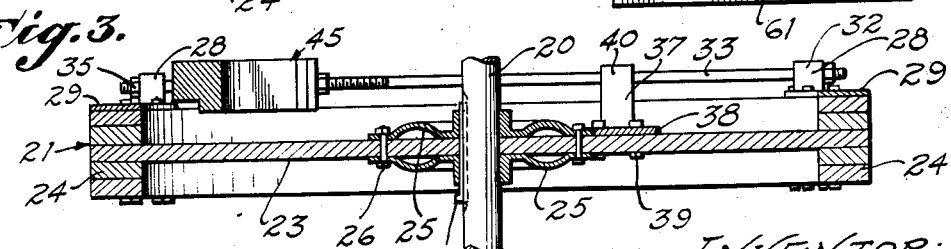
INVENTOR:
MAX J. MILZ,
BY
ATTORNEY.

Patented Apr. 3, 1928.

1,664,524

UNITED STATES PATENT OFFICE.

MAX J. MILZ, OF TAFT, CALIFORNIA, ASSIGNOR TO MIDWAY IRON WORKS, INC., OF TAFT, CALIFORNIA, A CORPORATION OF CALIFORNIA.

BAND-WHEEL COUNTERBALANCE.

Application filed July 12, 1926. Serial No. 121,825.

My invention relates to the oil producing industry and particularly to a novel form of band-wheel construction for use therein having a counterbalance structure incorporated in it. Derrick equipment, particularly in the oil producing industry, has a band-wheel which is secured on a rotatable band-wheel shaft. The band-wheel shaft has a walking-beam crank secured thereto which oscillates a walking-beam by a interconnecting pitman which is attached both to the walking-beam crank and to the walking-beam. The pump of the well is attached to one end of the walking-beam, and the weight which it places on the walking-beam is enormous. In order to counterbalance this weight so as to minimize the power consumption, it is common practice to hang a weight on the walking-beam, this relieving the driving means of considerable work.

It is the general object of this invention to provide a band-wheel construction having a counterbalance incorporated therein.

It is another object of the invention to provide a band-wheel structure of the character mentioned in which the counterbalance may be adjusted so as to obtain different forces. This feature of the invention is necessary because of the fact that the weight of the pump is different at each well, varying according to the depth of the well; therefore, each well must have a certain weight of counterbalance.

Another very important object of the invention is to provide a band-wheel structure in which the band-wheel is fully reinforced.

It is also an object of the invention to provide a band-wheel construction as mentioned in which the counterbalance weight may be moved to the center of the wheel so that there will be no eccentric weight placed thereon.

A still further object of the invention is to provide a band-wheel structure in which auxiliary weights may be attached to the counterbalance weight.

Other objects and advantages will be made evident hereinafter.

Referring to the drawing in which I illustrate the invention,

Fig. 1 is a diagrammatic view showing my invention applied to the ordinary derrick equipment.

Fig. 2 is an enlarged face view showing the band-wheel structure of the invention.

Fig. 3 is a section taken on the line 3—3 of Fig. 2.

Fig. 4 is a section taken on the line 4—4 of Fig. 2.

Fig. 5 is a section taken on the line 5—5 of Fig. 2.

Fig. 6 is a section taken on the line 6—6 of Fig. 2.

Fig. 7 is a section taken on the line 7—7 of Fig. 2.

Fig. 8 is a section taken on the line 8—8 of Fig. 1.

Referring to the drawing in detail and particularly Fig. 1, 11 is a derrick which is placed over a well from the upper end of which a pump tubing 12 extends. A polish rod 13 projects from the upper end of the pump tubing 12, the lower end thereof being connected with a pump plunger of the reciprocating pump at the bottom of the well. The reciprocating pump is not shown in the drawing. The polish rod 13 is connected to one end of a walking-beam 15 which is supported by a Samson post 16, by means of a stirrup 17. The opposite end of the walking-beam 15 has a pitman 18 connected thereto by means of which it is connected to a walking-beam crank 19. The walking-beam crank 19 is secured to a band-wheel shaft 20 on which a band-wheel construction 21 embodying the features of this invention is mounted. Placed adjacent to the band-wheel structure 21 and adapted to be driven thereby, is a sand reel 22.

Referring to Figs. 2 to 8 inclusive, the band-wheel construction 21 consists of a band-wheel proper having a web 23 surrounded by a rim 24. The band-wheel is rigidly mounted on the band-wheel shaft 20 by means of hub plates 25 which are secured to the web 23 by bolts 26 and which are locked to the band-wheel shaft 20 by a key 27.

Secured to the rim 24 on opposite sides of the band-wheel shaft 20 are brackets 28. One of the brackets 28 is placed at the side of the band-wheel shaft 20 to which the walking-beam crank 19 extends, whereas the other bracket 28 is placed on the opposite side of the band-wheel shaft 20. The brackets 28 have arcuated plates 29 which are secured to the rim 24 by suitable bolts 30. Formed on the arcuated plates 29 are bosses 32. The bosses 32 are arranged in pairs, the bosses of each of the pairs being substantially diametrally opposite each other, and extended across the face of the band-wheel, and supported by the pairs of bosses 32 are slide rods 33. The slide rods 33 extend through openings 34 formed in the bosses 32 and have tensioning nuts 35 screwed onto the ends thereof. The tensioning nuts 35 are provided for the purpose of placing the slide rods 33 under tension so that they will be very rigid without being extremely heavy. The slide rods 33 extend in planes parallel to the radial plane of extension of the walking-beam crank and they are placed on opposite sides of the band-wheel shaft 20 an equal distance therefrom. A brace 37 is secured to the web 23 of the band-wheel adjacent to the band-wheel shaft 20 and on the side thereof opposite the extension of the walking-beam crank 19. The brace 37 consists of a plate 38 which is secured to the web 23 by suitable bolts 39. Formed at opposite ends of the plate 38 are bosses 40 having openings 41 through which the slide rods 33 extend. The brace 37 is provided for the purpose of making the slide rods rigid, co-operating with the means for placing the tension on the slide rods.

The counterbalance weight of the invention is represented by the numeral 45. Formed near opposite ends of the counterbalance weight 45 are openings 46 through which the slide rods 33 extend. The counterbalance weight 45 is placed on the side of the band-wheel shaft 20 to which the walking-beam crank 19 extends. The counterbalance weight 45 may be slid radially relative to the band-wheel into various radial positions. The counterbalance weight 45 is provided with locking means by means of which it may be secured in different radial positions. The locking means consist of eye-bolts 47 which extend into cavities 48 formed in the opposite sides of the counterbalance weight 45. The slide rods extend through eyes 49 of the eye-bolts 47. Shafts 50 of the eye-bolts 47 extend outward from the cavities 48 through plates 52 and have nuts 53 screwed on the outer ends thereof. When the nuts 53 are cinched up tight the eye-bolts 47 are caused to grip the slide rods 33 as indicated clearly in Fig. 4. This places a clamping action on the slide rods 33 causing them to tightly engage the walls of the openings 46 and preventing the counterbalance weight 45 from moving. A slot 54 is formed in the counterbalance weight 45 connecting to the inner face thereof. This is provided so that the counterbalance weight 45 may be moved into the position indicated by dotted lines 55 in Fig. 2. When in this position the counterbalance weight 45 is concentric with respect to the band-wheel shaft 20 and there is no eccentric force in effect. When the counterbalance weight 45 is in extreme outer position the bosses 32 of one of the brackets 28 rest in cavities 56 formed in the outer part of the counterbalance weight 45. This is shown best in Fig. 8.

Projecting inward from the counterbalance weight 45 are studs 59 which are provided so that auxiliary weights 60 may be attached to the counterbalance weight 45. The auxiliary weights 60 have openings through which the studs 59 extend and have slides 61 as shown in Fig. 5 through which the slide rods 33 may extend. Nuts 62 are advanced onto the studs 59 for securing the auxiliary weights 60 in place.

After the pump of the well is installed and ready for operation the counterbalance weight 45 may be moved into a suitable radial position and clamped in this position by the clamping means described, so that the proper effective weight may be obtained. It is quite obvious that as the counterbalance weight 45 is moved away from the center of the band-wheel the lever arm increases and therefore the effective weight is increased. Because of the adjustability of the counterbalance weight 45 the band-wheel construction of my invention may be provided as a standard part of all derrick equipment, it being merely necessary to adjust the counterbalance weight 45 to suit the conditions at the individual wells.

When the pump or the pump rods are to be removed the sand reel 22 is employed for hoisting purposes. At this time the walking-beam is disconnected from the walking-beam crank and the sand reel 22 is driven by the band wheel, the rim 24 thereof engaging the sand reel and frictionally driving it. At this time the counterbalance is unnecessary and would seriously interfere with the revolving of the band-wheel, so it is moved into concentric position as represented by dotted lines 55 in Fig. 2. When in this position there is no counterbalance effect and the band-wheel may be rotated smoothly.

The balance wheel structure of my invention is of simplified design and may be provided at a slightly greater cost than the ordinary form of band-wheel. This additional cost, however, is more than compensated for by the advantages and convenience of having the counterbalance weight 45 mounted on the band-wheel. The feature of placing the slide rods 33 under tension is valuable to the invention by reason of the fact that it permits the slide rods 33 to be made rigid without requiring them to be extra heavy in cross section. The attaching of auxiliary weight 60 to the counterbalance weight 45 is a valuable feature because of the fact that conditions may arise in which an extra heavy counterbalance weight may be needed.

One big problem of the band-wheel construction was the providing of ample reinforcement. This problem is entirely met by attaching the brackets 28 to the rim 24 on opposite sides of the shaft 20 and tying them together by the rods 33 which are placed under tension, the rods being braced by the brace 37.

I claim as my invention:

1. In a band-wheel construction for derrick equipment, the combination of: a band-wheel; a rotatable band-wheel shaft on which said band-wheel is mounted; a walking-beam crank secured to said band-wheel shaft; a pair of brackets secured to said band-wheel; a pair of slide rods supported by said brackets, said slide rods extending across said band-wheel in a direction parallel to the direction of radial extension of said walking-beam crank; means for placing said slide rods under tension; a counterbalance slidably mounted on said slide rods at the side of said band-wheel adjacent to said walking-beam crank; and means for selectively securing said couterbalance in different radial positions.

2. In a band-wheed construction for derrick equipment, the combination of: a band-wheel; a rotatable band-wheel shaft on which said band-wheel is mounted; a walking-beam crank secured to said band-wheel shaft; a pair of brackets secured to said band-wheel; a pair of slide rods supported by said brackets, said slide rods extending across said band-wheel in a direction parallel to the direction of radial extension of said walking-beam crank; means for placing said slide rods under tension; a brace secured to said band-wheel between said brackets and on the side of said band-wheel shaft opposite from said walking-beam crank, said brace rigidifying said slide rods; a counterbalance slidably mounted on said slide rods at the side of said band-wheel adjacent to said walking-beam crank; and means for selectively securing said counterbalance in different radial positions.

3. In a band-wheel construction for derrick equipment, the combination of: a band-wheel; a rotatable band-wheel shaft on which said band-wheel is mounted; a walking-beam crank secured to said band-wheel shaft; a pair of brackets secured to said band-wheel; a pair of slide rods supported by said brackets, said slide rods extending across said band-wheel in a direction parallel to the direction of radial extension of said walking-beam crank; means for placing said slide rods under tension; a counterbalance slidably mounted on said slide rods at the side of said band-wheel adjacent to said walking-beam crank; means for selectively securing said counterbalance in different radial positions; auxiliary weights; and means for securing said auxiliary weights to said counterbalance.

4. In a band-wheel construction for derrick equipment, the combination of: a band-wheel; a pair of rods extending across one face of said band-wheel on opposite sides of an imaginary diametral line; means for attaching the opposite ends of said rods to the peripheral portion of said band-wheel; means for placing said rods under tension; and a counter balance carried by said rods.

5. In a band-wheel construction for derrick equipment, the combination of: a band-wheel; a pair of rods extending across one face of said band-wheel on opposite sides of an imaginary diametral line; brackets secured to a rim of said band-wheel for attaching the opposite ends of said rods to said band-wheel; means for placing said rods under tension; and a counter-balance carried by said rods.

6. In a band-wheel construction for derrick equipment, the combination of: a band-wheel; a pair of rods extending across one face of said band-wheel on opposite sides of an imaginary diametral line; means for attaching the opposite ends of said rods to said band-wheel; nuts screwed onto said rods and engaging said attaching means for placing said rods under tension; and a counter-balance carried by said rods.

7. In a band-wheel construction for derrick equipment, the combintion of: a band-wheel; a pair of rods extending across one face of said band-wheel on opposite sides of an imaginary diametral line; brackets secured to a rim of said band-wheel for attaching the opposite ends of said rods to said band-wheel; nuts screwed onto said rods and engaging said brackets for placing said rods under tension; and a counterbalance carried by said rods.

8. In a band-wheel construction for derrick equipment, the combination of: a band-wheel; a pair of rods extending across one face of said band-wheel on opposite sides of an imaginary diametral line; means for attaching said rods to said band-wheel; means for placing said rods under tension; a counterbalance carried by said rods; and rigidfying means disposed on one side of the center of said band-wheel and attached to said band-wheel for rigidifying said rods.

9. In a band-wheel construction for derrick equipment, the combination of: a band-wheel; a pair of rods extending across one face of said band-wheel on opposite sides of an imaginary diametral line; brackets secured to a rim of said band-wheel for attaching said rods to said band wheel; means for placing said rods under tension; a counterbalance carried by said rods; and rigidifying means disposed on one side of the center of said band-wheel and attached to said band-wheel for rigidifying said rods.

10. In a band-wheel construction for derrick equipment, the combination of: a band-wheel; a pair of rods extending across one face of said band-wheel on opposite sides of an imaginary diametral line; means for attaching said rods to said band-wheel; nuts screwed onto said rods and engaging said attaching means for placing said rods under tension; a counterbalance carried by said rods; and rigidifying means disposed on one side of the center of said band-wheel and attached to said band-wheel for rigidifying said rods.

In testimony whereof, I have hereunto set my hand at Los Angeles, California, this 6th day of July, 1926.

MAX J. MILZ.